United States Patent
Suggs et al.

[11] Patent Number: 5,709,514
[45] Date of Patent: Jan. 20, 1998

[54] LIVELOAD ASSEMBLY

[75] Inventors: Steven M. Suggs; Reid M. Meyer, both of Nacogdoches, Tex.

[73] Assignee: Acadia Elastomers, Inc., Nacogdoches, Tex.

[21] Appl. No.: 657,457

[22] Filed: May 30, 1996

[51] Int. Cl.⁶ .......................... F16B 39/12; F16B 39/24
[52] U.S. Cl. ........................ 411/150; 411/231; 411/544
[58] Field of Search ........................ 411/11, 149, 150, 411/155, 156, 231, 544; 277/106, 186

[56] References Cited

U.S. PATENT DOCUMENTS

| | | | |
|---|---|---|---|
| 2,042,691 | 6/1936 | Williams | 286/11 |
| 2,830,486 | 4/1958 | Dillon | |
| 2,983,121 | 5/1961 | Naas | 64/29 |
| 3,113,755 | 12/1963 | Stevens et al. | 248/358 |
| 3,873,079 | 3/1975 | Kuus | 267/162 |
| 3,968,970 | 7/1976 | Vogeli | 277/106 |
| 4,006,661 | 2/1977 | Sims, Jr. | 411/11 |
| 4,106,170 | 8/1978 | Schoeneweis | 29/157.1 R |
| 4,296,538 | 10/1981 | Straslicka | 29/156.4 R |
| 4,394,872 | 7/1983 | Schobl | 137/315 |
| 4,571,133 | 2/1986 | Lindow | 411/11 |
| 4,607,421 | 8/1986 | Zemek et al. | 29/157.1 R |
| 4,651,981 | 3/1987 | Passiniemi | 267/162 |
| 4,720,223 | 1/1988 | Neights et al. | 411/544 X |
| 5,024,453 | 6/1991 | Suggs | 277/106 |
| 5,090,087 | 2/1992 | Hipple et al. | 15/317 |
| 5,180,268 | 1/1993 | Richardson | 411/536 |
| 5,190,264 | 3/1993 | Boger | 251/214 |
| 5,192,049 | 3/1993 | Ridge | 251/214 |
| 5,316,319 | 5/1994 | Suggs | 411/544 X |

FOREIGN PATENT DOCUMENTS

| | | | |
|---|---|---|---|
| 422342 | 7/1990 | European Pat. Off. | |
| 318277 | 1/1920 | Germany | 411/231 |
| 1-303307 | 7/1989 | Japan | |
| 3669 | of 1911 | United Kingdom | |

*Primary Examiner*—Neill R. Wilson
*Attorney, Agent, or Firm*—Kennedy, Davis & Kennedy

[57] ABSTRACT

A liveload assembly for communicating a load to packing material through a flange member of a fluid flow apparatus while pre-stressing a stud holding the flange member with a different loading, in which a first set of compressible belleville washers are received on an open-ended sleeve of a stack guide and rest on a seat defined by a flange at one end of the sleeve, the stack guide and washers received into a recess of a retainer cup having a partially closed end which defines a threaded bore for threadingly engaging the retainer cup to a stud extending from the stuffing box and freely through a gland follower, whereby the first set of belleville washers, being compressed, communicate a load through the flange member to the packing material. A second set of belleville washers are received on the stud and rest on a beveled face of the retainer cap. A nut screwed onto the stud compresses the second set of belleville washers against the beveled face of the retainer cup for pre-stressing the stud. A method of maintaining a compressive force communicated through the flange member to the sealing material in a fluid flow apparatus while pre-stressing the stud is disclosed.

9 Claims, 2 Drawing Sheets

LIVELOAD ASSEMBLY

TECHNICAL FIELD

The present invention relates to an apparatus for maintaining torque on bolts in fluid flow control devices. More particularly, the present invention relates to an apparatus that applies a first load to sealing materials in fluid flow control devices while applying a second differing load to stablize bolts in the fluid flow control devices.

BACKGROUND OF THE INVENTION

Fluid leakage along shafts of valves and pumps, as well as between flange joints has long been recognized as serious problem in power and industrial plants.

Industrial and petrochemical processing plants typically include many types of fluid flow control equipment, such as pipes, valves, pumps, and flanges connections for such. Such fluid flow control equipment communicate liquids and gases for processing, typically at high temperatures and/or high pressures. Adjacent longitudinally aligned sections of pipe connect together at junctions with bolts that extend through aligned openings in the facing flanges at the ends of the respective pipes. The resilient gasket material is disposed between the parallel mating faces of the flanges to seal the interconnection between the adjacent pipes and thereby restrict fluid leakage from between the flanges. The bolts are secured by nuts in order to tightly join the pipes together. The number and spacing of bolts in geometric arrangement of the bolts around the flanges depends primarily on the diameter of the pipes and the pressure of the fluid flowing through the pipes and the flange connection.

The valves and pumps are housed in casings through which rotary or reciprocating shafts extend. For example, the shaft of a rotary pump operatively connects a motor on the exterior of the casing to an impeller on the interior of the casing. Such shafts rotate or reciprocate by turning knobs or handles by hand, by motors, or by impellers driven by fluid flowing in the equipment. The shaft passes through an opening in a portion of the casing known as the "stuffing box" This term refers to the method of preventing fluid leakage by stuffing a packing material around the shaft to provide the seal. The packing material is often composed of woven or braided fibers formed into coils, spirals or rings. The stuffing box receives an annular flange of a gland follower which bears against the packing to maintain the seal on the shaft. The gland follower is bolted to the casing in order to apply pressure to the packing and thereby effect a seal.

Rotating and reciprocating shafts are difficult to seal in order to prevent leakage. In operation, such shafts are capable of both radial and axial displacement. Radial displacement typically results form manufacturing inaccuracies. Axial displacement results from different thermal expansions produced through normal operation of the shaft. Furthermore, the stuffing box environment is less than ideal. Conditions are constantly changing. The packing may be required to withstand high temperatures and pressures one minute and low temperatures and pressures the next. Shaft speeds may also vary. The surfaces of the shaft in the stuffing box are often pitted and rough. Very slight defects in the arrangement or condition of a stuffing box can prevent proper pump operation. Systemic and equipment vibrations also cause nut off-torquing by which the torqued nuts tend to loosen or unscrew.

Generally speaking, there are three conditions that result in leakage from stuffing boxes connections: packing consolidation; bolt creep; and improper loading. These conditions affect flanges connections as well, although the following discussion refers generally to valves and pumps. Packing consolidation occurs naturally, and refers to the packing's tendency to settle, wear, and loosen over time. A number of factors contribute to this condition, including the constant rotation of the shaft, changes in temperature of fluids flowing through the equipment, and the age and material of the packing itself. As the packing consolidates, the torque on the gland follower lessens, and leakage along the shaft may result.

Bolt creep is a condition wherein the torqued gland bolts or studs are loosened in the fluid flow device due to the expansion and contraction of the gland follower and the casing. Such expansion and contraction often results from a change in operating temperatures and pressures. Valves and pumps in various industries often operate under conditions ranging from cryogenic to superheated temperatures, and normal to extreme pressures and vacuums. Bolt creep reduces the pressure applied by the gland follower on the packing. The problem of bolt creep can be reduced by pre-stressing the stud. This is accomplished by loading the stud up to sixty (60%) percent of its yield point. This is known as stabilizing the bolt. As the load on the bolt approaches the yield point of the bolt, the bolt is being stretched and thereby becomes more stable. At or above the yield point, the bolt is permanently deformed. The bolt must thereafter be replaced. For loading less than the yield point, the bolt returns to its original state (i.e., unstretches) upon removal of the load. Over 60% loading of the yield point becomes dangerous because the load could reach 100% of the yield point during ordinary operation. The amount of loading required in order to stabilize a bolt is significant. For example, a ⅝ inch alloy steel stud bolt under 120 foot-pounds torque requires 12,120 pounds force to reach sixty (60%) percent of its yield point.

Improper loading is a condition wherein the compression exerted by the gland follower on the packing is insufficient to effect a seal. Packing consolidation and bolt creep are contributing elements of improper loading, because both reduce the compressive force applied by the gland follower on the packing. But inaccurate torquing of the gland bolts by workers also causes improper loading. Such inaccurate torquing may be the result of human errors. However, it has been recognized that torque wrenches are often inaccurate, resulting in improper loading. Leaks may thus occur because the load on the packing is insufficient to maintain a seal.

In recognition of this problem, various attempts have been made to obtain leak-free performance and reduce maintenance requirements for a pump or a valve. For example, improved packing materials were developed for a large range of temperatures, better chemical resistance, and improved coefficient of expansion characteristics. Torque values were established for the bolts connecting the gland follower to the stuffing box. Routine maintenance programs include re-torquing of gland follower bolts.

Another way to increase leak-free performance and reduce maintenance requirements involves liveloading of the gland follower. Liveloading refers to the mounting of compressed springs on the gland follower whereby a constant pressure is exerted on the gland follower to insure a constant compressive force is exerted on the packing. As the packing consolidates or the gland bolts loosen, the spring pressure moves the gland follower towards the stuffing box to maintain the integrity of the packing. In contrast with the loading on pre-stressed studs, packing is typically loaded with no more than about 5,000 pounds of force.

Belleville washers are one type of spring typically used to cushion heavy loads with short motion. Uncompressed belleville springs or washers typically take the form of a disk with an open center. In contrast, compressed belleville washers are flat. A significant amount of force is required to compress or flatten the uncompressed belleville washers. Belleville washers installed on the gland bolts of pump and valve stuffing boxes maintain the force exerted by the gland follower on the packing. As the packing consolidates or the gland bolts loosen, the belleville washers decompress and maintain the load on the packing. The gland follower essentially becomes self adjusting in response to the packing's condition to maintain a proper load on the packing and thereby maintain a seal.

Liveloading a gland follower is difficult in many situations. Existing bolts may be too short to receive a sufficient number of uncompressed belleville washers. Replacing bolts is difficult and time consuming. Achieving the proper load on the belleville washers is difficult, even with torque wrenches. Belleville washers are of small size and difficult to install about a gland bolt, particularly if the installers need to wear gloves. Also, belleville washers, once placed on a gland bolt and even when properly torqued, may slip laterally and hang or catch on the bolt. This causes hysteresis, a retardation of the self-adjusting effect of the belleville washers on the gland follower. Further, liveloading a gland follower or flange conflicts with pre-stressing the bolt stud, as the loading for pre-stressing the bolt is significantly greater than that for loading the packing, or the gasket.

Thus, there exists a need in the art for an improved compact apparatus for liveloading sealing materials while also stabilizing the bolt stud, which is free of the problems typically experienced when liveloading fluid flow apparatus such as valves, pumps, and flanges in power and industrial plants.

SUMMARY OF THE PRESENT INVENTION

The present invention overcomes the problems in the art by providing a liveload assembly for communicating force to sealing materials while pre-stressing a stud. More particularly described with respect to valves and pumps, the liveload assembly communicates force to an axially translatable gland follower which compresses packing in a stuffing box of a fluid flow apparatus while pre-stressing studs holding the gland follower in the stuffing box. For flanges, the liveload assembly communicates force to the flange to maintain the gasket in compression while pre-stressing the flange studs.

The liveload assembly comprises a retainer cup that receives a stack of belleville washers in an open cylindrical recess. A partially closed end of the cup defines a threaded bore which is coaxially aligned with a stud that extends from the fluid flow control device through the stack of belleville washers. An exterior skirt-like wall of the retainer cup defines a series of planar faces thereon, for engagement by a tool for rotating the retainer cup relative to the bolt. Rotation of the retainer cup compresses the belleville washers enclosed within the retainer cup against the fluid flow control device. An exterior face of the partially closed end of the retainer cup defines a beveled, or shallowly raised convex, surface. A second set of belleville washers is received on the stud against the exterior face. A nut threadingly engages the stud and being tightened against the stack of second belleville washers and the beveled face, secures the second set of belleville washers in the compressed position for communicating a loading to the stud.

The present invention further provides a method of maintaining a compressive force communicated through a flange member to sealing material in a fluid flow apparatus while pre-stressing a stud holding the flange member. In pumps and valves, the seal material is packing and the flange members is a gland follower. In pipe connections, the sealing material is a gasket and the flange member is the flanges on the pipes. The method stacks a first set of belleville washers on a stud which extends through the flange member. A retainer cup having a cylindrical recess is received over the stack of belleville washers to enclose the stack within the retainer cup. The stud extends through a partially closed end of the retainer cup, which defines a threaded bore that is coaxially aligned with the stud. The retainer cup is then rotated to threadedly engage the retainer cup to the stud and thereby compress the belleville washers between an inner surface of the partially closed end of the retainer cup and the flange member. The compressed belleville washers apply a load to the sealing material through the flange member.

The stud is then pre-stressed by stacking a second set of belleville washers on the stud, which washers sit in contact on a beveled exterior face of the partially closed end of the retainer cup. A nut is then screwed onto the stud to compress the second set of belleville washers against the exterior surface of the partially closed end and thereby apply a load to the stud.

In a preferred embodiment, the first set of belleville washers are first stacked onto a stack guide having an open-ended cylindrical sleeve of a first diameter for being received on the stud. A laterally extending flange defines the seat for the belleville washers at a first end of the cylinder. The flange is disposed at a perpendicular angle to a longitudinal axis of the cylinder and has a second diameter greater than the first diameter. The recess in the retainer cup then receives both the stack guide and the stack of belleville washers. The bevel angle on the exterior face is defined by the angle of the belleville washers when subjected to the maximum safe stress.

Objects, features and advantages will become apparent upon reading of the following detailed description in conjunction with the drawings and the appended claims.

DETAILED DESCRIPTION OF THE DRAWINGS

Figure 1:
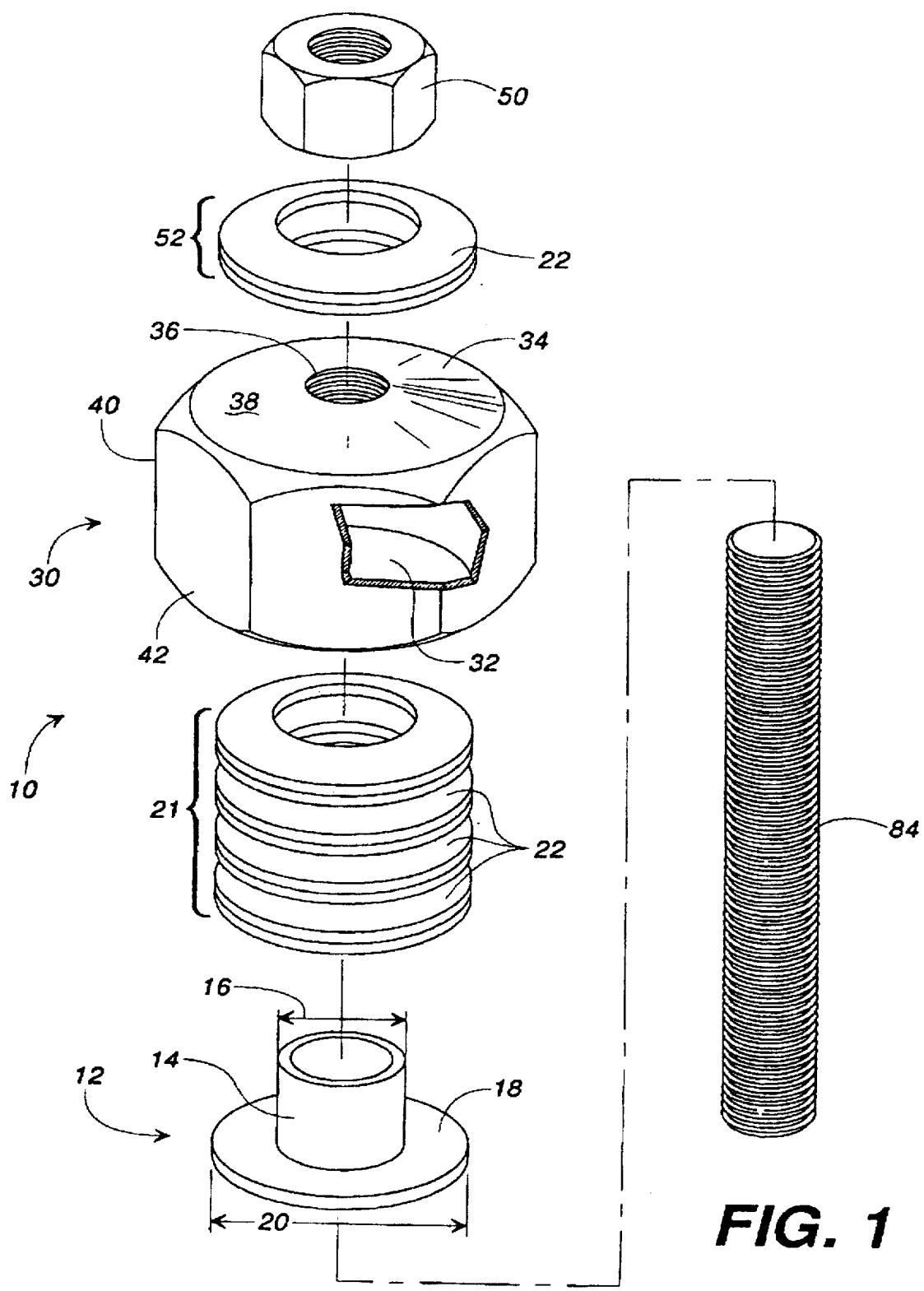
FIG. 1 is a perspective exploded partially cut-away view of a preferred embodiment of a liveload assembly of the present invention.

Referring now in more detail to the drawings, in which like numerals indicate like parts throughout the several views, FIG. 1 illustrates in exploded perspective cut-away view a liveload assembly 10 constructed in accordance with the present invention for communicating a load to a flange member which compresses sealing material in a fluid flow apparatus, while pre-stressing a stud 11 that holds the flange member. In an embodiment for a valve or pump, the liveload assembly 10 communicates the load to an axially translatable gland follower, a flange-like annular device which compresses packing in a stuffing box. In an embodiment for flange connection of pipes, the liveload assembly 10 communicates the load through the flanges to the gasket between the faces of the flanges. For convenience of discussion, the present invention is described below with particular respect to its application for valves and pumps having the axially translatable gland follower.

In the preferred illustrated embodiment, a stack guide 12 has an open-ended cylindrical sleeve 14 of a first diameter 16. A flange 18 extends laterally from a first end of the sleeve 14. The flange 18 is disposed at a perpendicular angle to a longitudinal axis of the sleeve 14. The flange 18 has a second diameter 20 greater than the first diameter 16.

The flange 18 defines a seat that supports a first set 21 of compressible belleville washers 22 which are stacked coaxially on the sleeve 14. The belleville washers 22 are ring-like dished disks which flatten when compressed under force. Manufacturers of belleville washers publish specifications showing the dimensions of the washers and the load carried by the washer under compression at specified percent deflection. The specifications are used to select belleville washers for maintaining torque for a particular installation, as discussed below. The stack guide 12 maintains the washer 22 in coaxial alignment.

A retainer cup 30 defines an open cylindrical recess 32 that receives the stack guide 12 with the stack of belleville washers 22 thereon. The retainer cup 30 has a partially closed end 34 opposite the opening for the recess 32. The end 34 defines a threaded bore 36 which coaxially aligns with the sleeve 14, for a purpose discussed below. An exterior surface of the partially closed end 34 defines a shallowly raised convex face, generally 38. The face 38 is a shallowly tapered projection or bevel. The face 38 slopes upwardly at an angle from an exterior edge to the axis of the bore. The angle equals the angle of the belleville washers at a predetermined loading. In a preferred embodiment, the belleville washers are set for 80% compression. This allows additional loading to be applied to the stud without overloading the washers. The angle is determined by compressing the belleville washer to the desired force, and measuring. The retainer cup 30 further defines the recess 32 with an exterior skirt-like wall 40. The wall 40 defines a series of planar faces 42, for being engaged by a tool for rotating the retainer cup 30, as discussed below.

The retainer cup 30 accordingly defines an enclosing member in which the belleville washers 22 sit in compression between the inner surface of the end 34 and the seat 18. In a preferred embodiment, the outside diameters of the compressed belleville washers 22 have about 0.015 inch clearance overall to fit in the recess 32 of the retainer cup 30.

A second stack 52 of belleville washers is received on the exterior face 38 and coaxially aligned with the threaded bore 36. A nut 50 is engaged to the stud 11 and rotated to compress the second stack 52 of belleville washers against the dished face 38 for pre-stressing the stud.

The liveload assembly 10 installs on the stud 11 to maintain compression on packing despite loss of torque, while also pre-stressing the stud. A typical application would be to liveload the studs of a gland follower of fluid flow apparatus such as a pump or valve. For example, in FIG. 2, there is shown in a cross-sectional view a casing 60 including embodiments of the liveload assembly 10 which maintain compressive force on the packing in the stuffing box. The casing 60 is representative of a casing for either a pump or valve. Both fluid flow apparatus typically use stuffing box seals to reduce or eliminate leaks along rotatable shafts. For discussion purposes, the casing 60 will be considered part of a pump having a discharge side 64 and an inlet side 66. A rotatable shaft 68 connects to an impeller (not shown) at one end and to a motor (not shown) at the other end. A bushing 70 supports the rotatable shaft 68 in the pump.

The casing 60 of the pump defines a gland stuffing box 72. The stuffing box 72 defines an annular region 73 through which the shaft 68 extends. Compression packing 74 is held in the annular region 73 of the stuffing box 72 to seal the casing 60 and prevent fluid leakage along the shaft 68. The illustrated embodiment includes a lantern ring 76 which communicates with an aperture 78 for the introduction of lubricants to the packing 74, as necessary. In an alternate embodiment (not illustrated), a spacer ring is disposed between the packing and the bushing 70, for reducing the number of packing rings required in the stuffing box, for reducing friction between the packing and the shaft, and for improving transfer of loading to the packing.

A gland follower 80 includes an annular flange 82 which inserts in the annular region 73 of the stuffing box 72. The gland follower 80 includes bores 83. The studs 11 connect to the stuffing box 72 by threadably engaging bores 85. Each of the studs 11 passes through one of the bores 83 in the gland follower 80. Liveload assemblies 10 and 10a shown in cut-away view are held on to the top of the gland follower 80. The first set 21 of compressed belleville washers 22 push against the inner surface of the end 34 of the retainer cup 30 and the seat 18 of the stack guide 12. The retainer cup 30 is fixed to the stud 11 by engagement with the threaded bore 36. The loading of the first set 21 of compressed belleville washers 22 accordingly is communicated to the gland follower 80 to maintain the compression load on the packing 74 in the stuffing box 72. The nut 50 threads on the stud 11 compressing the second set 52 of belleville washers against the face 38 of the retainer cup 30. This helps lock the retainer cap 30 in place relative the stud 11 and the casing 60 and also holds the second set 52 of belleville washers in compression for pre-stressing the stud 11.

Figure 2:
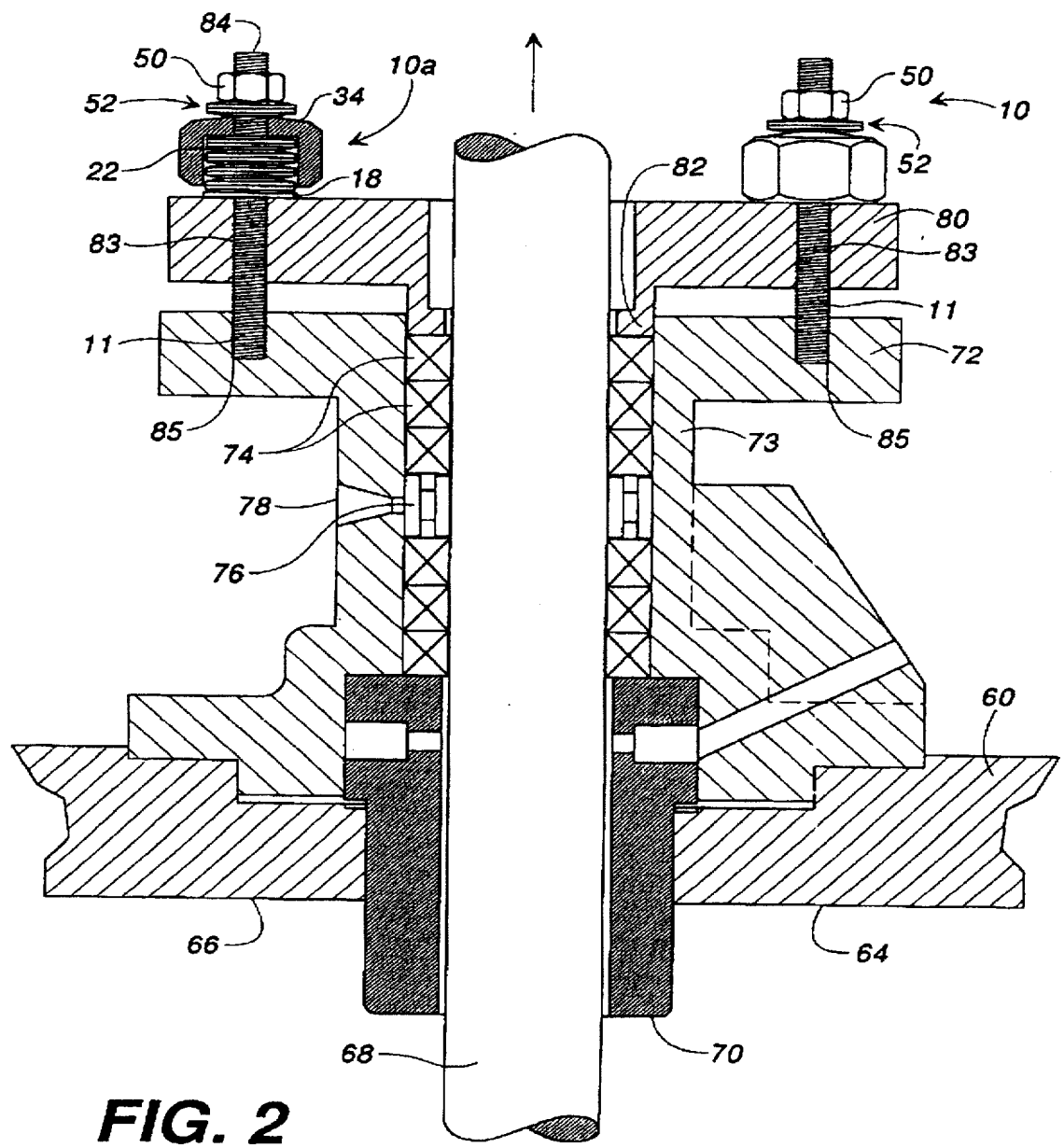
FIG. 2 is a cross-sectional view of a fluid flow device having embodiments of the liveload assembly illustrated in FIG. 1 attached to a gland follower of a stuffing box.

With reference to FIG. 2, the gland follower 80 is live-loaded by first installing the packing 74 in the annular region 73 of the stuffing box 72. The gland follower 80 is then positioned with the annular flange 82 in the open top of the annular region 73 of the stuffing box 72. The gland follower 80 moves relative the casing 60 guided by the studs 11. The studs 11 extend through the bores 83 as the gland follower 80 is positioned on the stuffing box 72.

In a preferred method, the belleville washers 22 for the first stack 21 are placed over the sleeve 14 and on the seat 18 of the stack guide 12. The stud 11 slidably receives the stack guide 12 with the belleville washers 22, and the seat 18 bottoms against the gland follower 80. The retainer cup 30 is inverted and placed over the stack of belleville washers 22. The retainer cup 30 is rotated by hand to engage the thread of the bore 36 with the stud 11. After the threads are engaged, a wrench is fitted to the retainer cup 30 in contact with the faces 42. The retainer cup 30 is rotated relative the stud 11 and towards the gland follower 80. The belleville washers 22 are thereby compressed between the inner surface of the partially closed end 34 and the planar seat 18. The lower edge of the exterior wall 40 is moved closer to the upper surface of the gland follower or flange. The rotation, and concurrent compression, continues until a second end of the sleeve 14 contacts the inner surface of the end 34. The lower edge of the retainer cup bottoms against the outer surface of the gland follower 80.

The second stack 52 of belleville washers are coaxially received on the stud 11. The nut 50 is then threaded on the stud 11 and tightened. This compresses the second set 52 of the belleville washers between the nut 50 and the face 38 of the retainer cup 30. In the preferred illustrated embodiment, the belleville washers are compressed into parallel contacting alignment with the exterior surface 38. The belleville washers should not be flattened completely as that may damage the washers. Thus the exterior face 38 preferably defines a convex surface.

The nut 50 secures the retainer cup 30 from rotation and secures the second set 52 of belleville washers 22 in compression. The force of the compressed first set 21 belleville washers 22 then communicates through the gland follower 80 to the packing 74 in the stuffing box 72. The compressed second set 52 of belleville washers pre-stresses the stud 11 to resist bolt creep. One liveload assembly 10 is positioned on each stud 11. The assembly 10a is illustrated partially torqued down to bring the retainer cap into contact with the gland follower, while the assembly 10b is illustrated fully torqued.

As the packing 74 consolidates and compresses, the gland follower 80 is pushed axially by the liveload assemblies 10 and 10a towards the stuffing box 72 to maintain compression on the packing 74. Movement of the gland follower 80 causes the stack guide 12 to move axially with respect to the stud 11. When the gland follower 80 moves, the compression on the belleville washers 22 lessens. The height of the stack of belleville washers 22 increases relative to the assembly 10. As more of the washers 22 in the retainer cup 30 become visible between the lower edge of the wall 40 and the gland follower 80, the height of the stack of the belleville washers 22, and therefore the relative compression, can be monitored. The exposed edges of the washers 22 is an indication of the load provided by the liveload assembly 10. When the height of the stack increases significantly, the retainer cup 30 should be tightened to recompress the belleville washers 22 and the nut 50 also re-tightened. However, such movement is significantly reduced with the present invention because the second set 52 of belleville washers pre-stresses the stud, which reduces bolt creep.

It is to be appreciated that the use of the stack guide 12 facilitates holding the first stack of belleville washers in coaxial alignment, and prevents the inner diameter edge of the belleville washers from interlocking with the threaded stud. The low force loading on the packing and the high force loading on the stud can be accomplished without the use of the stack guide 12.

A preferred embodiment uses belleville springs with linear regressive load deflection such as those manufactured by National Disc Spring Division, Rolex Company, Hillside, N.J. Such belleville springs provide a direct correlation between the compression lost by changes in the packing 74 and the movement of the stack guide 12 relative to the retainer cup 30 threaded onto the stud 11. Other types of belleville washers will work with the stack guide 12 and retainer cap 30 of the present invention, but to equate deflection to compression requires reference to a formula or the manufacturer's spring table specifications.

For example, the liveload assembly 10 is designed to apply force to a gland follower of a pump. A data sheet describing the pump specifies the pressure to be held, the diameter of gland bolts, and the type of packing. Based on this information, the type and size of belleville washer is selected by referring to specification sheets published by manufacturers of such washers. The specifications typically show the dimensions of the washer and the load carried by each washer. The dimensions include the inner and outer diameters of the washer, the height of the uncompressed washer, the thickness of the washer, and the loads are specified at various percent deflections.

According to the present invention, the depth of the recess 32 in which the belleville washers 22 sit is determined by the total height of the stack of belleville washers 22 at a predetermined deflection. Deflections approaching 100% overstress the washers. A preferred deflection is 80%. The belleville washer are selected based on the bolt diameter and the pressure in the fluid flow apparatus. For example, a pump has gland bolts with a one-half inch diameter and the maximum pressure is 100 pounds. An AM321620 spring washer supplied by National Disk Springs Division of Rolex Company, Hillside, N.J. has an inner diameter of 0.642 inch and an outer diameter of 1.1 inch. The belleville washer preferably fit with close tolerances on the gland bolt. The washer provides 114 pounds of load at 25% deflection and 264 pounds at 75% deflection. The height of an uncompressed washer is 0.0709 inches; at 75% compression, the height is reduced 0.0238 inch; at 25% compression, the height is reduced 0.0079 inch.

The depth of the recess 32 in the retainer cup 30 equals the height of the stack without compression less the reduction in height due to the compression. For example, if six washers are to be used in the assembly, the depth of the recess is computed as follows:

$$6 \text{ washers} \times (0.0709 - 0.0238 \text{ inches}) = 0.2826 \text{ inches}$$

The diameter of the recess 32 is preferably about 0.015 inches greater than the outer diameter of the washer, or 1.115 inches.

The liveload assembly 10 of the present invention may be installed quickly on valves and pumps to a predetermined loading without the use of torque wrenches. The loading is set by bottoming the retainer cup 30 relative to the gland follower 80, as discussed above. In contrast, it may take as much as an hour or more to position belleville washers on a valve or pump and compress them to the proper loading using a torque wrench.

The principles, preferred embodiments and modes of operation of the present invention have been described in the foregoing specification. The invention is not to be construed as limited to the particular forms disclosed, because these are regarded as illustrious rather than restrictive. Moreover, variations and changes may be made by those skilled in the art without departing from the spirit of the invention as set forth by the following claims.

What is claimed is:

1. A liveload assembly for communicating a first load through a flange member of a fluid flow apparatus to sealing material in the fluid flow apparatus while communicating a second load which loads pre-stress studs that secure the flange member, comprising:

a retainer cup having an open cylindrical recess that receives a first set of belleville washers therein and a partially closed end defining a threaded bore therethrough which bore is coaxially aligned for threadedly engaging a stud extending through the sleeve from a flange member of a fluid flow apparatus, an exterior skirt-like wall of the retainer cup defined by a series of planar faces thereon, and an exterior surface of the partially closed end defining a beveled face;

a first set of belleville washers having a first portion received within the recess coaxially with the bore and a second portion subsequently received within the retainer cup by threading the retainer cup on to the stud;

a second set of belleville washers stacked on the exterior surface of the partially closed end of the retainer cup coaxially with the threaded bore; and a nut for threadingly engaging the stud and compressing the second set of belleville washers between the retainer cup and the nut for communicating a second load to the stud, whereby the first set of belleville washers, being compressed by threading the retainer cup onto the stud until a lower edge of the retainer cup contacts an upper surface of the flange member, communicates a load against the flange member for loading the sealing material while the nut being engaged onto the threaded stud compresses the second set of belleville washers against the beveled face, said loads for pre-stressing the stud.

2. The liveload assembly as recited in claim 1, wherein the depth the recess of the cup is about 80% of the height of the uncompressed stack of the belleville washers.

3. The liveload assembly as recited in claim 1, further comprising a stack guide having an open-ended sleeve of a first diameter and a planar annular seat defined by a flange extending laterally from a first end of the sleeve and at a perpendicular angle to a longitudinal axis of the sleeve, the flange having a second diameter greater than the first diameter, for receiving thereon the first set of belleville washers.

4. A method of maintaining a compressive force communicated through a flange member to sealing material in a fluid flow apparatus, while pre-stressing studs securing the flange member with a second load, comprising the steps of:

(a) stacking a first set of belleville washers onto a stud extending freely through a flange member of a fluid flow apparatus;

(b) inverting a retainer cup having a cylindrical recess therein over the stack of first belleville washers, whereby a portion of the first set of belleville washers are enclosed within the retainer cup, the retainer cup having a partially closed end defining a threaded bore that is coaxially aligned for threadedly engaging the stud extending through the flange member;

(c) rotating the retainer cup to engage the stud to the threaded bore thereof, thereby compressing the first set of the belleville washers between an inner surface of the partially closed end of the retainer cup and the flange member, until a lower edge of the retainer cup contacts the flange member and thereby enclosing the first set of belleville washers within the retainer cup;

(d) stacking a second set of belleville washers on the stud and resting on an exterior face of the partially closed end of the retainer cup; and (e) screwing a nut onto the stud extending through the threaded bore compressing the second set of belleville washers against the partially closed end, whereby the force of the first set of compressed belleville washers is communicated through the flange member to the sealing material in the fluid flow apparatus and together with the force of the second set of compressed belleville washers pre-stresses the stud.

5. The method as recited in claim 4, comprising the step of placing the first set of belleville washers on a planar seat of a stack guide having an open-ended sleeve of a first diameter, the seat defined by a laterally extending flange at a first end of the sleeve disposed at a perpendicular angle to a longitudinal axis of the sleeve and having a second diameter greater than the first diameter, before the belleville washers are enclosed in the inverted retainer cup.

6. A liveload assembly for communicating a first load through a flange member of a fluid flow apparatus to sealing material in the fluid flow apparatus to sealing material in the fluid flow apparatus while communicating a second load which loads pre-stress a stud that secures the flange member, comprising:

a retainer cup having an open cylindrical recess that receives a first set of belleville washers therein and a partially closed end defining a threaded bore therethrough which bore is coaxially aligned for threadedly engaging a stud extending through the sleeve from a flange member of a fluid flow apparatus;

a first set of belleville washers having a first portion received within the recess coaxially with the bore and a second portion subsequently received within the retainer cup by threading the retainer cup on to the stud;

a second set of belleville washers stacked on the exterior surface of the partially closed end of the retainer cup coaxially with the threaded bore; and a nut for threadingly engaging the stud and compressing the second set of belleville washers between the retainer cup and the nut for pre-stressing the stud, whereby the first set of belleville washers, being compressed by threading the retainer cup onto the stud until a lower edge of the retainer cup contacts an upper surface of the flange member, communicates a load against the flange member for loading the sealing material while the nut being engaged onto the threaded stud compresses the second set of belleville washers against the beveled face, said loads for pre-stressing the stud.

7. The liveload assembly as recited in claim 6, wherein an exterior face of the retainer cup defines means for engaging a tool for rotating the retainer cup.

8. The liveload assembly as recited in claim 7, wherein engaging means comprises at least a pair of planar faces for engaging a wrench for rotating the retainer cup.

9. The liveload assembly as recited in claim 6, wherein an exterior surface of the partially closed end of the retainer cup defines a beveled face at a predetermined angle that corresponds to an angle defined by a selected belleville washer at a predetermined compression loading.

* * * * *